(12) United States Patent
Ha et al.

(10) Patent No.: US 6,894,757 B2
(45) Date of Patent: May 17, 2005

(54) LIQUID CRYSTAL DISPLAY DEVICE

(75) Inventors: Jin-Ho Ha, Suwon-si (KR); Se-In Chang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 105 days.

(21) Appl. No.: 10/190,561

(22) Filed: Jul. 9, 2002

(65) Prior Publication Data

US 2003/0011736 A1 Jan. 16, 2003

(30) Foreign Application Priority Data

Jul. 10, 2001 (KR) ........................................ 2001-41036

(51) Int. Cl.[7] .............................................. G02F 1/345
(52) U.S. Cl. ........................ 349/149; 349/58; 349/110; 349/111
(58) Field of Search ........................... 349/149, 58, 110, 349/11

(56) References Cited

U.S. PATENT DOCUMENTS

| | | | | |
|---|---|---|---|---|
| 5,146,354 A | * | 9/1992 | Plesinger | 349/59 |
| 5,422,751 A | * | 6/1995 | Lewis et al. | 349/59 |
| 5,986,726 A | * | 11/1999 | Murai | 349/59 |
| 6,175,396 B1 | * | 1/2001 | Kim et al. | 349/58 |
| 6,667,780 B2 | * | 12/2003 | Cho | 349/58 |
| 2002/0033919 A1 | * | 3/2002 | Sanelle et al. | 349/122 |
| 2002/0126236 A1 | * | 9/2002 | Hiratsuka et al. | 349/58 |
| 2002/0186333 A1 | * | 12/2002 | Ha et al. | 349/58 |

* cited by examiner

Primary Examiner—Jared J. Fureman
Assistant Examiner—Allyson N Trail
(74) Attorney, Agent, or Firm—McGuireWoods LLP

(57) ABSTRACT

Disclosed are a liquid crystal display (LCD) device and a method for assembling the LCD device. The LCD device has a display section for displaying images, a receiving container for receiving the display section, a power supplying section for supplying a power source to the display section, a signal converting section for converting signals from the display section and a securing section for securing the power supplying section and the signal converting section to the receiving container. The power supplying section and the signal converting section are disposed between the display section and the securing section that is directly facing to a rear surface of the receiving container. Accordingly, a total thickness and weight of the LCD device can be minimized and an assembly facility of the LCD device can be improved

21 Claims, 17 Drawing Sheets

LIQUID CRYSTAL DISPLAY DEVICE

BACKGROUND OF THE INVENTION

1. Field of the Invention

The present invention relates to a liquid crystal display device (LCD), and more particularly, to a LCD device of which a size and a weight are reduced.

2. Description of the Related Art

In recent times, information processing devices continue to rapidly develop with various architectures, functions and faster information processing speed. Information processed in these information processing devices has an electrical signal format. In order to visually confirm information processed in the information processing device, a display as an interface should be provided.

Recently, a LCD device that is lighter, and smaller than a CRT type display device has been developed. The LCD device has a full color displaying function and a high resolution. As a result, the LCD device is widely used as a monitor of a computer, a television, and another display device.

The LCD device applies a voltage to a predetermined molecular arrangement of a liquid crystal to convert the molecular arrangement to another molecular arrangement. The LCD device converts the changes of optical properties to visional changes and uses the modulation of a light by using a liquid crystal cell.

LCD devices are divided into to a TN (Twisted Nematic) type and a STN (Super-Twisted Nematic) type, and are also divided into an active matrix display type that uses a switching device and a TN liquid crystal and a passive matrix display type that uses a STN liquid crystal according to the driving type.

The active matrix display type is used in a TFT-LCD and drives an LCD by using a thin film transistor (TFT) as a switch. The passive matrix display type does not use any transistor and does not need a complex circuit.

Further, LCD devices are divided into a transparent LCD device that uses a backlight and a reflective LCD device that uses an exterior light source according to a method for using a light source.

The transparent LCD device that uses the back light as a light source has a heavy weight and a large volume due to the existence of the back light, but is widely used since it independently displays an image without using an exterior light source.

FIG. 1 is an exploded perspective view schematically showing a conventional LCD device 100. FIG. 2 is a sectional view showing a combination construction of the LCD device 100 shown in FIG. 1.

Referring to FIG. 1, the LCD device 100 has a LCD module 130 for displaying an image when an image signal is applied thereto and front and rear cases 110 and 120 for receiving the LCD module 130. The LCD module 130 includes a display unit 170 having a LCD panel for displaying the image and a backlight assembly 150 for supplying light to the display unit 170.

The display unit 170 includes a LCD panel 171, a data side printed circuit board 176, a gate side printed circuit board 175, a data side tape carrier package 178 and a gate side tape carrier package 174.

The LCD panel 171 has a TFT substrate 172, a color filter substrate 173 and liquid crystal (not shown).

The TFT substrate 172 is a transparent glass board on which the TFTs are formed in a matrix type. Data lines are respectively connected to Source terminals of the TFTs and gate lines connected with gate terminals of the TFTs. Furthermore, pixel electrodes are respectively formed at drain terminals of the TFTs, which are comprised of a transparent conductive material such as Indium Tin Oxide (ITO).

The color filter substrate 173 faces to the TFT substrate 172. RGB pixels are formed on the color filter substrate 173 via a thin film process, which gives a predetermined color while the light passes through the color filter substrate 173. Common electrodes made of ITO are coated on the front surface of the color filter substrate 173.

When the TFTs of the TFT substrate 172 are turned on by applying electric power to the gate terminals and to the source terminals of the TFTs, an electric field is formed between the pixel electrodes of the TFT substrate 172 and the common electrodes of the color filter substrate 173. The electric field forces the liquid crystal, which is injected between the TFT substrate 172 and the color filter substrate 173, to change the array angle thereof resulting in that the transmission of the light is changed. As a result, the desired pixels are obtained.

Meanwhile, a driving signal and a timing signal are applied to the gate lines and data lines of the TFT to control the array angle of the liquid crystal and the time of arraying the liquid crystal in the LCD panel 171. As shown in FIG. 1, the data side tape carrier package 178 that is comprised of flexible circuit boards, is attached to the source portion of the LCD panel 171 to decide a time of applying a data driving signal. On the other hand, the gate side tape carrier package 174 is attached to the gate portion of the LCD panel 171 to decide an application time of a gate driving signal.

The data side printed circuit board 176 and the gate side printed circuit board 175, which respectively apply the driving signal to the gate line and to the data line as soon as receiving image signals input from outside of the LCD panel 171, make contact with the data side tape carrier package 178 for the data line and the gate side tape carrier package 174 for the gate line in the LCD panel 171, respectively. A source portion is formed on the data side printed circuit board 176 to receive the image signals from an information process device (not shown) such as a computer, etc. and then to provide the gate driving signal for the gate line of the LCD panel 171 and a gate portion is formed on the gate side printed circuit board 175 to provide the gate driving signal to the gate lines of the LCD panel 171. That is, the data side printed circuit boards 176 and the gate side printed circuit board 175 generate and apply the gate driving signal and the data signal for driving the LCD device and a plurality of timing signals for applying the gate driving signal and the data signal to the gate lines and the data lines of the LCD panel 171, so as to provide the gate driving signal through the gate side tape carrier package 174 to the gate lines of the LCD panel 171 and to supply the data signal through the data side tape carrier package 178 to the data lines of the LCD panel 171.

The backlight assembly 150 is provided under the display unit 170 to uniformly supply the light to the display unit 170. The backlight assembly 150 includes lamp units 161 and 162, which are disposed at both ends of a LCD module 130, for generating the light, a light guide plate 152 for guiding the light emitted by the lamp units 161 and 162 toward the display unit 170 by changing a pathway of the light, a plurality of optical sheets 153 for uniformly making a brightness of the light which is transmitted from the light guide plate 152 and a light reflecting plate 154, which is provided under the light guide plate 152, for reflecting a leaked light to the light guide plate 152 so as to improve the efficiency of the light The display unit 171 and the backlight assembly 150 are successively received in a mold frame 132 used as a receiving container. The mold frame 132 is provided with a top chassis 140, which faces and is combined with the mold frame 132, for preventing the display unit 171 from departing from the mold frame 132.

Meanwhile, the LCD device further includes a power supply printed circuit board 135, which has an inverter circuit for supplying the power source to the lamps of the lamp units 161 and 162 and a signal conversion printed circuit board 134 for converting and providing outer data signals to the data side printed circuit board 176.

The power supply printed circuit board 135 and the signal conversion printed circuit board 134 are fixed to a rear surface of the bottom chassis 131 by means of a bracket 133, as shown in FIGS. 1 and 2. Particularly, when the top chassis 140 is assembled with the mold frame 132 to form the LCD module 130, the LCD module 130 is received in the front case 110. The power supply printed circuit board 135 and the signal conversion printed circuit board 134 are combined to the rear surface of the bracket 133 by means of the screws 134c, 134d and 135b so that supports 134a, 134b and 135a are disposed between the rear surface of the bracket 133 and the power supply printed circuit boards 135 and the signal conversion printed circuit board 134. The bracket 133 is combined with the front case 110 by means of screws 133a and 133b.

Then, a shield case 136 is disposed at the rear surface of the bracket 133 to enclose the power supply printed circuit board 135 and the signal conversion printed circuit board 134. The shield case 136 insulates an electromagnetic wave generated form the LCD module 130 including the power supply printed circuit board 135 and the signal conversion printed circuit board 134.

As described above, when the bracket 133 and the shield case 136 are combined to the rear surface of the LCD module 130, the rear case 120 is coupled to the front case 110 and supported by the support 180 to complete the LCD monitor device (see FIG. 3).

As shown in FIG. 2, the power supply printed circuit board 135 and the signal conversion printed circuit board 134 are mounted on the rear surface of the LCD module 130 by the combination with the bracket 133 having a predetermined height. Further, the shield case 136 is coupled to the rear surface of the bracket 133 by means of the screws 136a and 136b.

In the conventional LCD device, there are many problems as follows.

Firstly, with reference to FIG. 2, the thickness t1 of the LCD device increases to the extent of the heights of the bracket 133 and the shield case 136 and the heights of the supports 134a, 134b and 134a for fixing the power supply printed circuit board 135 and the signal conversion printed circuit board 134 to the bracket 133. Particularly, a thickness t2 of a rear surface of the LCD device greatly increases due to the bracket 133 and the shield case 136 as shown in FIG. 4.

Secondly, since the power supply printed circuit board 135 and the signal conversion printed circuit board 134 are installed to be adjacent to both ends of the bracket 133, an area of the shield case 136 is excessively wide for covering them. Thus, the end portion of the LCD device is as thick as the center portion of the LCD device.

Thirdly, since the power supply printed circuit board 135 and the signal conversion printed circuit board 134 are placed at a position far away from the lamp units 161 and 162 and from the data side printed circuit board 176, as not shown in detail in drawings, there is a problem in that a line for supplying the power and a line for transferring the signals are longer. Furthermore, when the line for supplying the power and the line for transferring the signals are longer, it becomes difficult to include and to fix the lines to the LCD module 130 in a stable fashion.

SUMMARY OF THE INVENTION

The present invention has been made to solve the aforementioned problem, and accordingly it is an object of the present invention to provide a LCD device in which a total size and a weight can be reduced.

It is another object of the present invention to provide a LCD device in which a size can be minimized by using a support for rigidly making an installation of the LCD device.

To achieve objects of the present invention, a LCD device according to an embodiment of the present invention includes displaying means for displaying image; receiving means for receiving the displaying means; a printed circuit board mounted on a back surface of the receiving means, for controlling an operation of the displaying means; and shielding means mounted on the back surface of the receiving means for shielding electromagnetic waves from the printed circuit board. The shielding means is mounted on a center portion of the back surface of the receiving means while enclosing the printed circuit board so that edges of the receiving means are exposed at a predetermined width.

The receiving means includes a bottom chassis for receiving the displaying means and a mold frame having a bottom surface opened so that a back surface of the bottom chassis in which the printed circuit board is mounted is exposed, for receiving the bottom chassis. The printed circuit board may be a power supplying means mounted on the back surface of the receiving means, for supplying the power to the displaying means, and a signal converting means mounted on the back surface of the receiving means, for converting signals supplied to the displaying means.

Furthermore, the displaying means includes an integrated and printed circuit board electrically connected to the signal converting means and a flexible printed circuit board, for controlling the operation and an operating time of the displaying means in response to the signals from the power supplying means and from the signal converting means.

The LCD device further includes a power supplying line for supplying the power from the power supplying means to a lamp of the displaying means and a securing member for securing the power supplying line for the lamp to the back surface of the receiving means.

The securing member includes a belt type securing band, having first and second through-holes at each end thereof and bent so that the first and second through-holes are opposite to each other to receive the line for supplying the power to the lamp and a first locking screw that extends through the first and second through-holes of the securing band bent to receive the line for supplying the power to the lamp, for securing the securing band to the bottom chassis.

In order to achieve another object of the present invention, a LCD device according to the other embodiment of the present invention includes a displaying device; a front case for receiving the displaying device in front of the displaying device; and a rear case combined with the front case in back of the displaying device, wherein the rear case has a region projecting at a predetermined height to receive the shielding means.

The displaying device has displaying means for displaying the image, receiving means for receiving the image displaying means, a printed circuit board mounted on a back surface of the receiving means, for controlling an operation of the displaying means, and shielding means mounted at a center portion of the back surface of the receiving means, for shielding electromagnetic waves from the printed circuit board; a front case for receiving the displaying device in front of the displaying device; and a rear case combined with the front case in back of the displaying device, wherein the rear case has a region projecting at a predetermined height to receive the shielding means.

The LCD device may further include an abutment combined with the projected region in a back surface of the rear case, for supporting the displaying device.

In the LCD device according to the present invention, an inverter board and an analog/digital board are combined with the bottom chassis to be in close contact to the back surface of the bottom chassis. The shield case for shielding the electromagnetic waves from the analog/digital board and from the inverter board only covers the analog/digital board and the inverter board so that the edges of the bottom chassis and the mold frame are exposed.

Accordingly, it is possible to manufacture the LCD device in which the edge except for a region, in which the analog/digital board and the inverter board are mounted, has the same thickness as the LCD module. By minimizing a total thickness of the LCD device, the thinner and lighter LCD device can be obtained.

BRIEF DESCRIPTION OF THE DRAWINGS

The above and other objects and advantages of the present invention will become more apparent by describing in detail the preferred embodiments thereof with reference to the accompanying drawings, in which.

DESCRIPTION OF THE PREFERRED EMBODIMENT

Hereinafter, LCD devices according to the preferred embodiments of the present invention will be described in detail with reference to the accompanying drawings.

Figure 1:
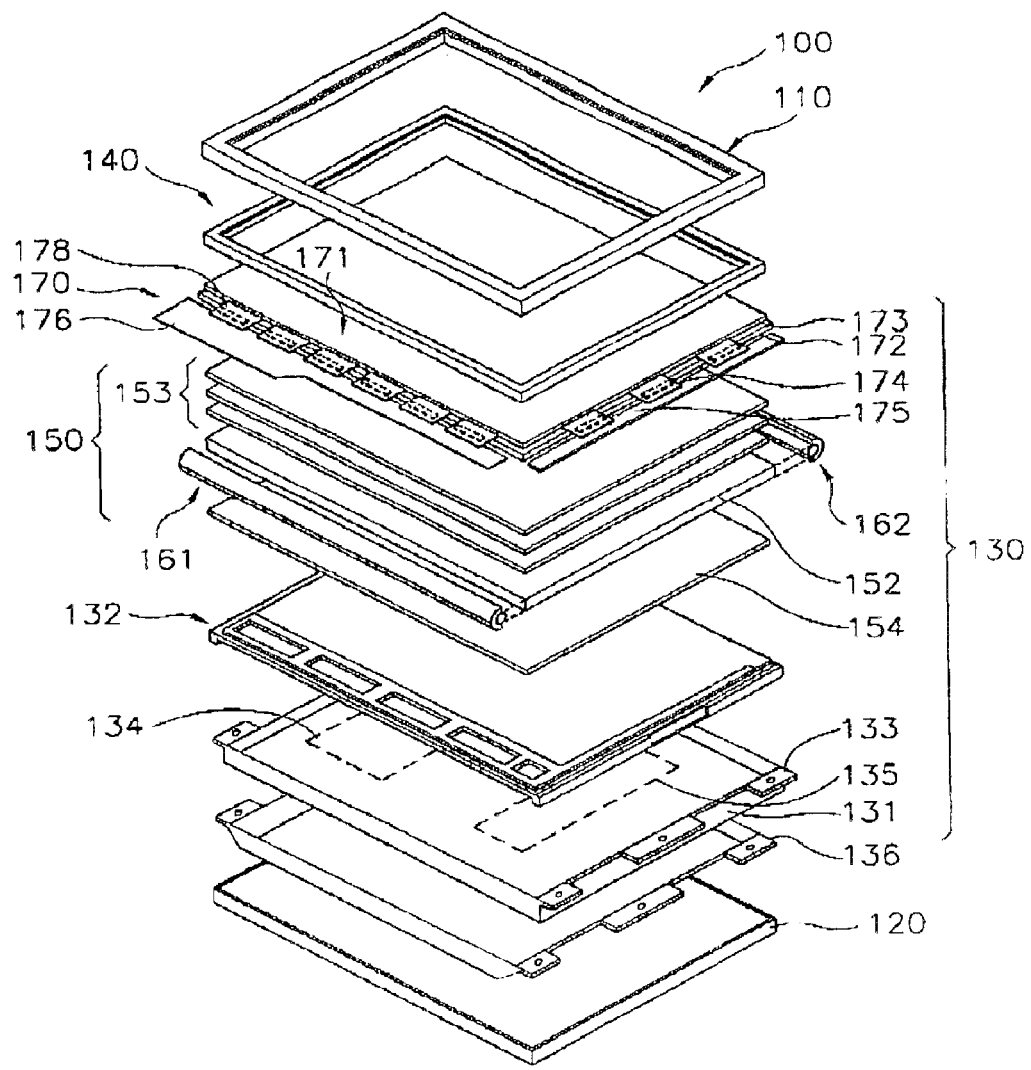
FIG. 1 is an exploded perspective view schematically showing a conventional LCD device.
Figure 2:
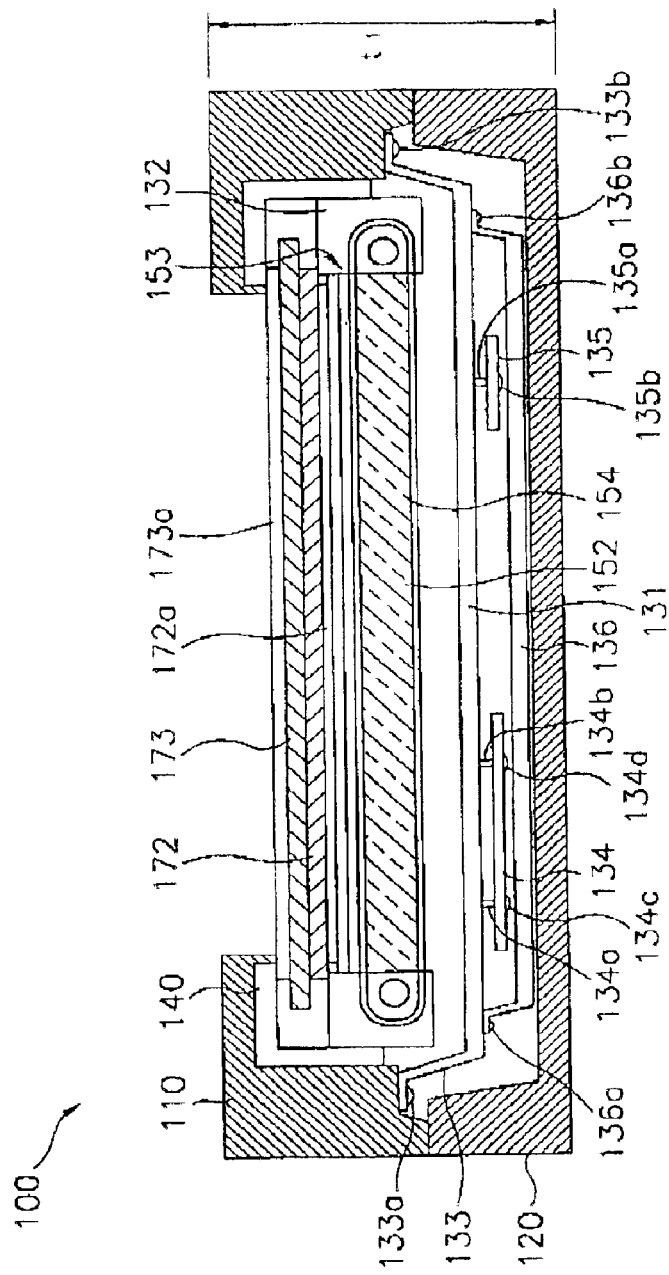
FIG. 2 is a sectional view showing a combination construction of the LCD device shown in FIG. 1.
Figure 3:
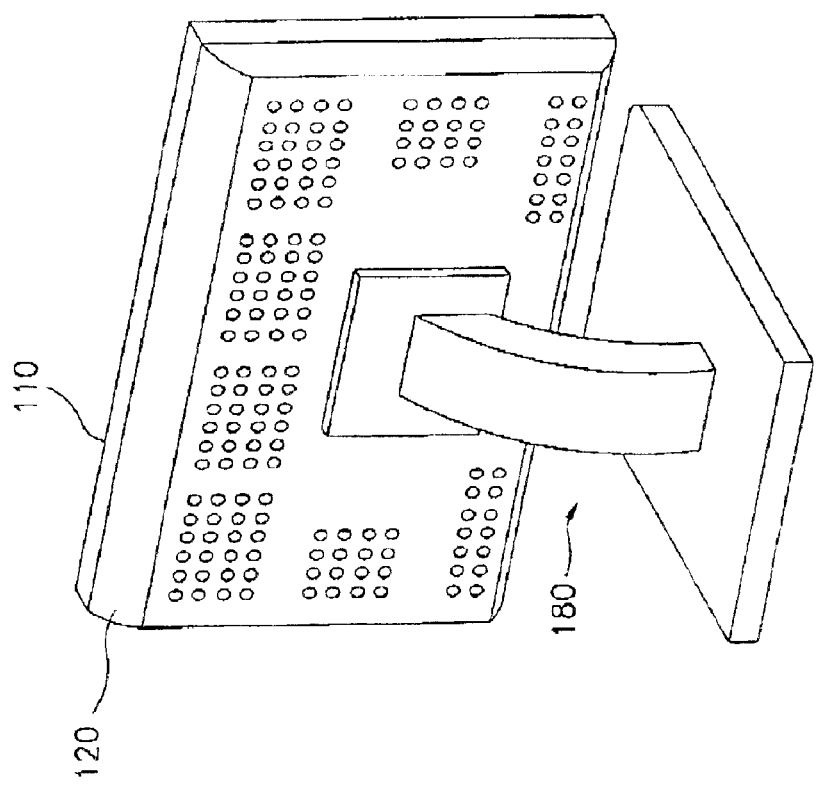
FIGS. 3 and 4 are perspective views showing an exterior of a LCD device shown in FIG. 1.
Figure 4:
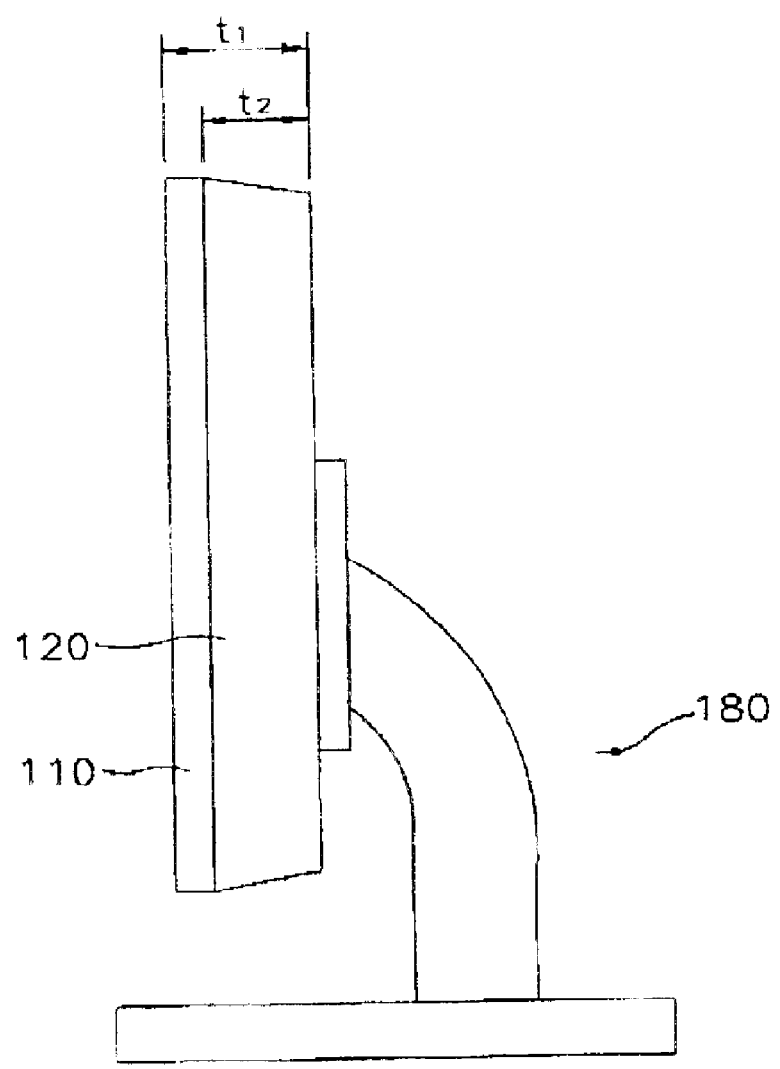
Figure 5:
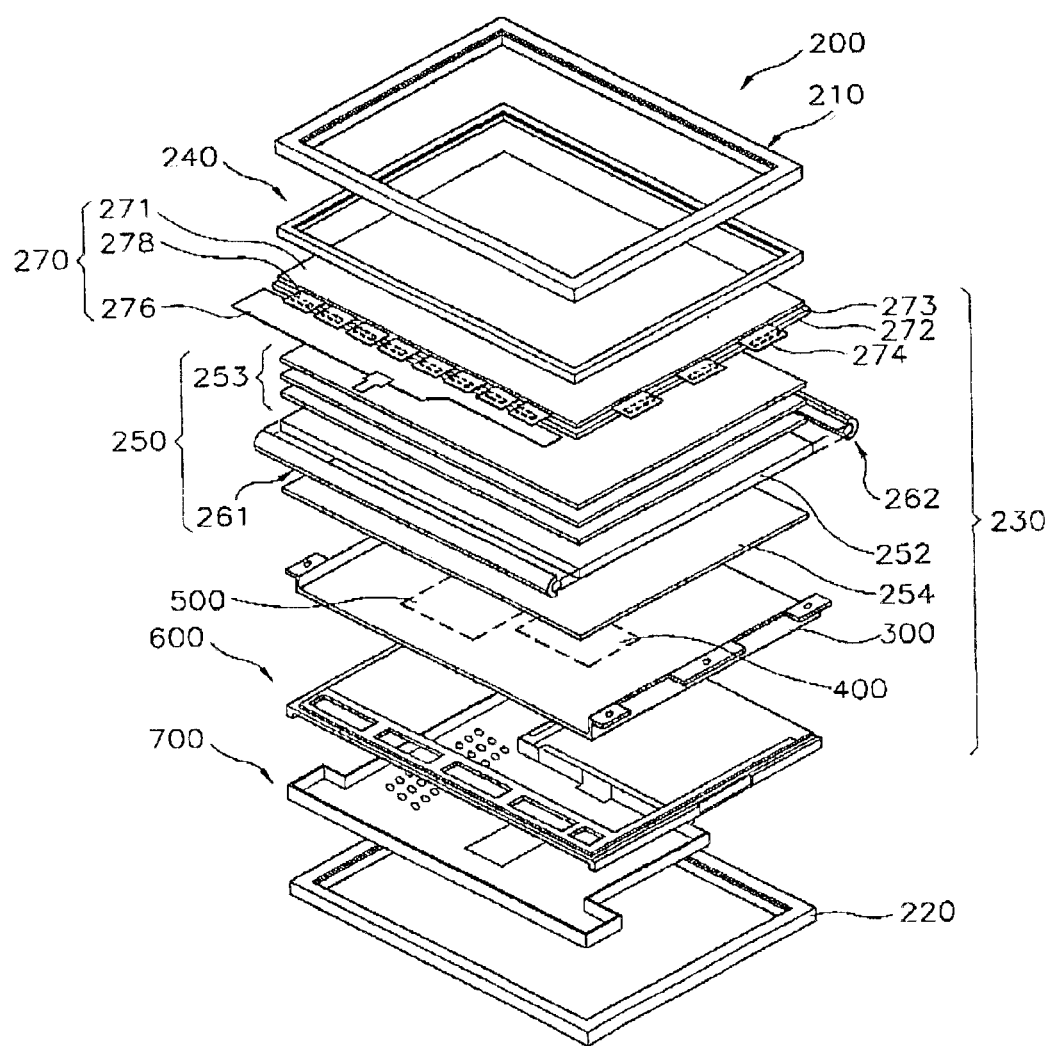
FIG. 5 is an exploded sectional view showing a LCD device according to a preferred embodiment of the present invention.

FIG. 5 is an exploded perspective view schematically showing a LCD device according to a preferred embodiment of the present invention.

Referring to FIG. 5, the LCD device 200 includes a LCD module 230 for displaying an image when an image signal is applied thereto and a case that has front and rear cases 210 and 220, for receiving the LCD module 230.

The LCD module 230 can be generally and functionally divided into a section for displaying the image, a receiving container for receiving the displaying section and a section for controlling an operation of the displaying section.

Particularly, the displaying section has a display unit 270 including a LCD panel 271 and a backlight assembly 250 for supplying a light to the display unit 270. The receiving container has a bottom chassis 300 for receiving the display unit 270 and the backlight assembly 250 and a mold frame 600 for receiving and supporting the bottom chassis 300, of which a bottom surface is opened to expose a rear surface of the bottom chassis 300.

Furthermore, the section for controlling the operation of the display section has a printed circuit board 500 (hereinafter, referred to as an inverter board 500) for supplying the power to the displaying section and a printed circuit board 400 (hereinafter, referred to as an A/D board 400) for converting a signal provided to the displaying section. A shield case 700 is disposed between the receiving container and the rear case 220 to shield an electromagnetic wave discharged from the inverter board 500 and the A/D board 400.

Hereinafter, a construction of the LCD device as described above will be explained in detail.

The display unit 270 has the LCD panel 271, a panel-driving printed circuit board 276 (hereinafter, referred to as an integrated PCB 276) for operating the LCD panel 271, a data side tape carrier package 278 and a gate side tape carrier package 274.

Here, the integrated PCB 276 contains a gate line driving circuit connected to the gate side tape carrier package 274 to drive a gate line of the LCD panel 271 and a data line driving circuit connected to the data side tape carrier package 278 to drive a data line of the LCD panel 271.

That is, the gate side tape carrier package 274 contains a wiring pattern for providing signals driving the gate line to the LCD panel 271 and a connector for electrically connecting the gate side tape carrier package 274 to the integrated PCB 276. The integrated PCR 276 Is combined through the data side tape carrier package 278 with a side of the LCD panel 271. A detail of a pathway through which the driving signals for driving the gate line and the data line are transmitted will be described below.

Meanwhile, since the integrated PCB 276 is constructed of the driving circuits of the gate printed circuit board and the data printed circuit board that are respectively made are integrated in one piece, high-density packaging techniques are required for packaging the integrated PCB 276. In the present invention, by applying a method of a chip on glass, parts of the gate driving circuit and the data driving circuit may be installed on the board not in a package but in a chip or a part by wire bonding and bumping.

The LCD panel 271 comprises a TFT substrate 272, a color filter substrate 273 and a liquid crystal (not shown).

The TFT substrate 272 is a transparent glass substrate on which TFTs in a matrix type are formed. A data line is connected with source terminals of the TFTs and a gate line is connected with gate terminals of the TFTs. Furthermore, pixel electrodes made of ITO, which is a transparent and conductive material, are formed at drain terminals of the TFTs.

When electric signals are applied to the data line and to the gate line, the electric signals are input into the source terminals and the gate terminals of the respective TFT. As the electric signals are input into the TFTs, the TFTs are respectively turned-on or turned-off, resulting in outputting the electric signals, which are required to form pixels, to the drain terminals.

The color filter substrate 273 is provided to face to the TFT substrate 272. The color filter substrate 273 has RGB pixels, which are formed by a thin film process to give desired colors while the light passes through the color filter substrate 273. A surface of the color filter substrate 273 is coated with common electrodes made of ITO.

When the electric power is applied to the gate and source terminals of the transistors on the TFT substrate 272 to turn on the TFTs, an electric field is formed between the pixel electrodes and common electrodes of the color filter substrate 273. This electric field changes an array angle of the liquid crystal injected between the TFT substrate 272 and the color filter substrate 273, resulting in that a light transmissivity depending on the changed array angle also is changed so as to produce the desired pixels.

A driving signal and a timing signal are applied to the gate line and to the data line of the TFTs to control the array angle of the liquid crystal and the time at which the liquid crystal is arranged in the LCD panel 271.

As shown in FIG. 5, the data side tape carrier package 278, which is comprised of flexible circuit boards, is attached to the source portion of the LCD panel 271 to decide a time at which a data driving signal is applied to the LCD panel 271. On the other hand, the gate tape carrier package 274 is attached to the gate portion of the LCD panel 271 to decide a time at which a gate driving signal is applied to the LCD panel 271.

The integrated PCB 276, which applies the driving signal to the gate line and to the data line as soon as receiving image signals input from outside of the LCD panel 271, makes contact with the data side tape carrier package 278 for the data line in the LCD panel 271. A source portion and a gate portion are formed on the integrated PCB 276. The source portion receives the image signals from an information processing device (not shown) such as a computer, etc. and then provides the data driving signal for the data line of the LCD panel 271. The gate portion provides the gate driving signal for the gate line of the LCD panel 271.

That is, the integrated PCB 276 generates the gate driving signal and the data signal for driving the LCD device and the plural timing signals for applying the gate driving signal and the data signal in an acceptable time, so as to apply the gate driving signal through the gate side tape carrier package 274 to the gate line of the LCD panel 271 and the data signal through the data side tape carrier package 278 to the data line of the LCD panel 271.

However, it can be noted that each of the printed circuit boards can be respectively substituted for the source portion and for the gate portion formed on the integrated PCB 276. On the other hand, it is also noted that a printed circuit board is substituted for the gate portion of the integrated PCB 276 so as to be connected to the gate side tape carrier package 274 and only the source portion can be formed in the integrated PCB 276 to be connected to the data side tape carrier package 278 as shown in FIG. 5.

A backlight assembly 250 is disposed under the display unit 270 to supply the light to the display unit 270 uniformly. The backlight assembly 250 includes first and second lamp units 261 and 262 for generating the light. The first and second lamp units 261 and 262 respectively have two lamps.

A light guide plate 252 has a size corresponding to that of the LCD panel 271 of the display unit 270 and is disposed under the LCD panel 271 so as to guide the light generated from the first and second lamp units 261 and 262 to the display unit 270 while changing the pathway of the light.

Meanwhile, a plurality of optical sheets 253 are disposed on the light guide plate 252 to make uniform the brightness of the light from the light guide plate 252 to the LCD panel 271. Furthermore, a reflection plate 254 is provided under the light guide plate 252 to reflect the light leaked from the light guide plate 252 to the light guide plate 252, thereby increasing the light efficiency.

The display unit 270 and the backlight assembly 250 are received in a bottom chassis 300 used as a receiving container, which is fixedly supported by means of a mold frame 600. The mold frame 600 has an opening at a bottom surface to expose the rear surface of the bottom chassis 300. Furthermore, an area of the mold frame 600 in which the integrated PCB 276 is mounted in a bending state partially opens so that the mold frame 600 can receive elements installed on the integrated PCB 276.

An inverter board 500 and an AID board 400 for converting signals are mounted on the rear surface of the bottom chassis 300, which is exposed through the opening in the bottom surface of the mold frame 600. The inverter board 500 transforms the electric power at a predetermined voltage level before providing the electric power to the first and second lamp units 261 and 262. The A/D board 400 is connected to the integrated PCB 276 to convert analog data signals into digital data signals before supplying the data signals to the LCD panel 271. The A/D board 400 and the inverter board 600 are fixed to the bottom chassis 300 by means of a securing member, for example, brackets. The fixture of the A/D board 400 and the inverter board 500, will be described below.

Meanwhile, a top chassis 240 is disposed on the display unit 270 to prevent the display unit 270 from departing from the bottom chassis 300 while it undergoes bending of the integrated PCB 276 to be outside of the mold frame 600.

Figure 6:
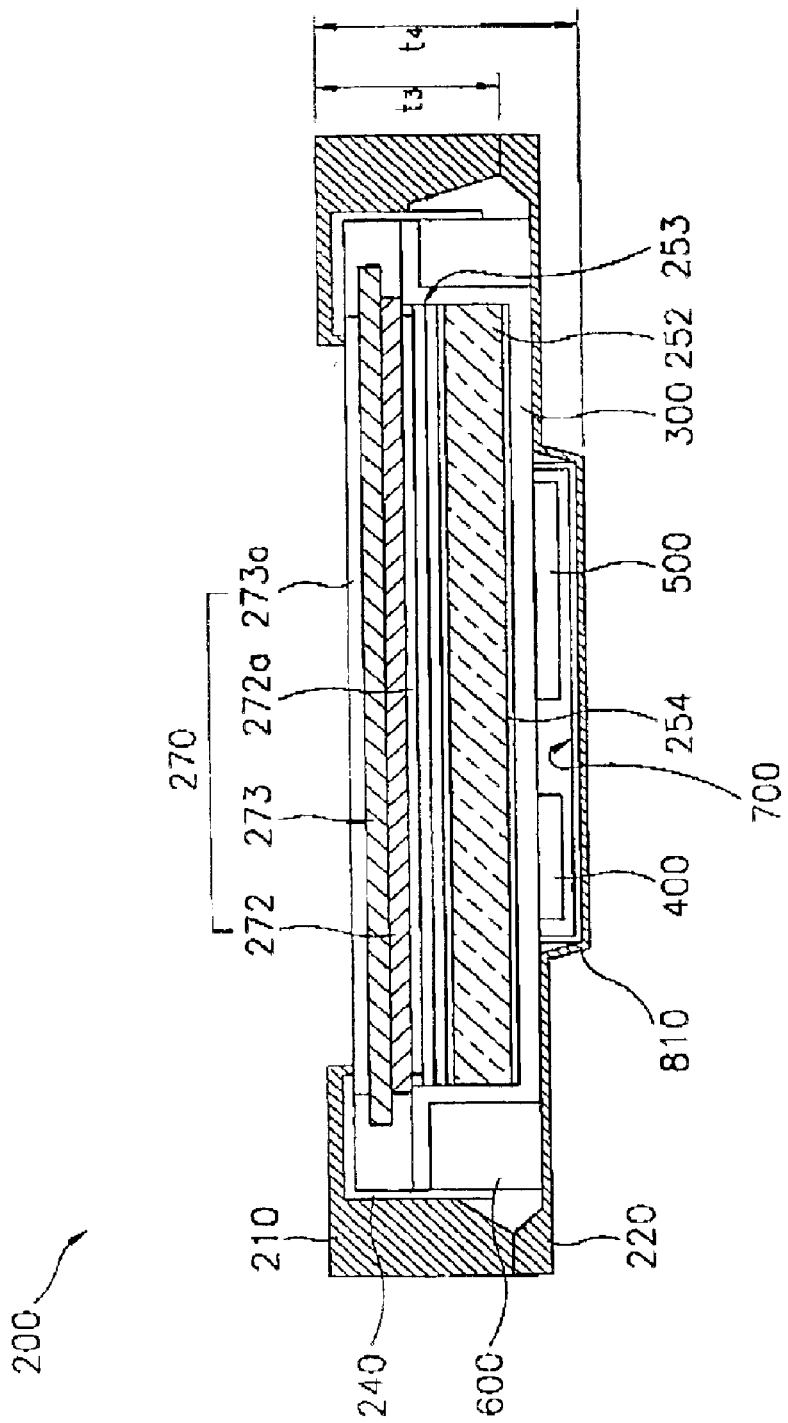
FIG. 6 is a sectional view showing a combination construction of the LCD device shown in FIG. 5.

FIG. 6 is a view of showing a combination construction of the LCD monitor device as shown in FIG. 5.

Referring to FIG. 6, the reflection plate 254, the light guide plate 252, the optical sheet 253 and the display unit 270 are sequentially received in the bottom chassis 300 that is disposed in the mold frame 600. The A/D board 400 and the inverter board 500 are fixed on the back surface of the bottom chassis 300. A shield case 700 is combined to the back surface of the mold frame 600 to shield an electromagnetic wave discharged from the A/D board 400 and from the inverter board 500 while enclosing the A/D board 400 and the inverter board 500.

Also, the A/D board 400 and the inverter board 600 are concentrically mounted at a center portion of the back surface of the bottom chassis 300. Accordingly, the shield case 700 results in a small size and encloses the A/D board 400 and the inverter board 500.

In other words, the shield case 700 does not cover the back surfaces of the bottom chassis 300 and the mold frame 600 entirely, but only covers the bent integrated PCB 276 on the back surfaces of the A/D board 400, the inverter board 500 and the mold frame 600. Accordingly, even though the shield case 700 is combined to the bottom chassis 300, the edges of the bottom chassis 300 and the mold frame 600 are partially exposed.

Then, the front case 210 and the rear case 220 are respectively combined with the top chassis 240 and the shield case 700 to cover the exposed edges of the bottom chassis 300 and the mold frame 600, thereby completing the assembly of the LCD device.

As shown in FIG. 6, in the LCD device, the thickness t3 of the edge portion on which the shield case 700 is not covered is thinner than the thickness t4 of the center portion on which the shield case 700 is covered. The thickness of the LCD device will be described with reference to the drawings.

Figure 7:
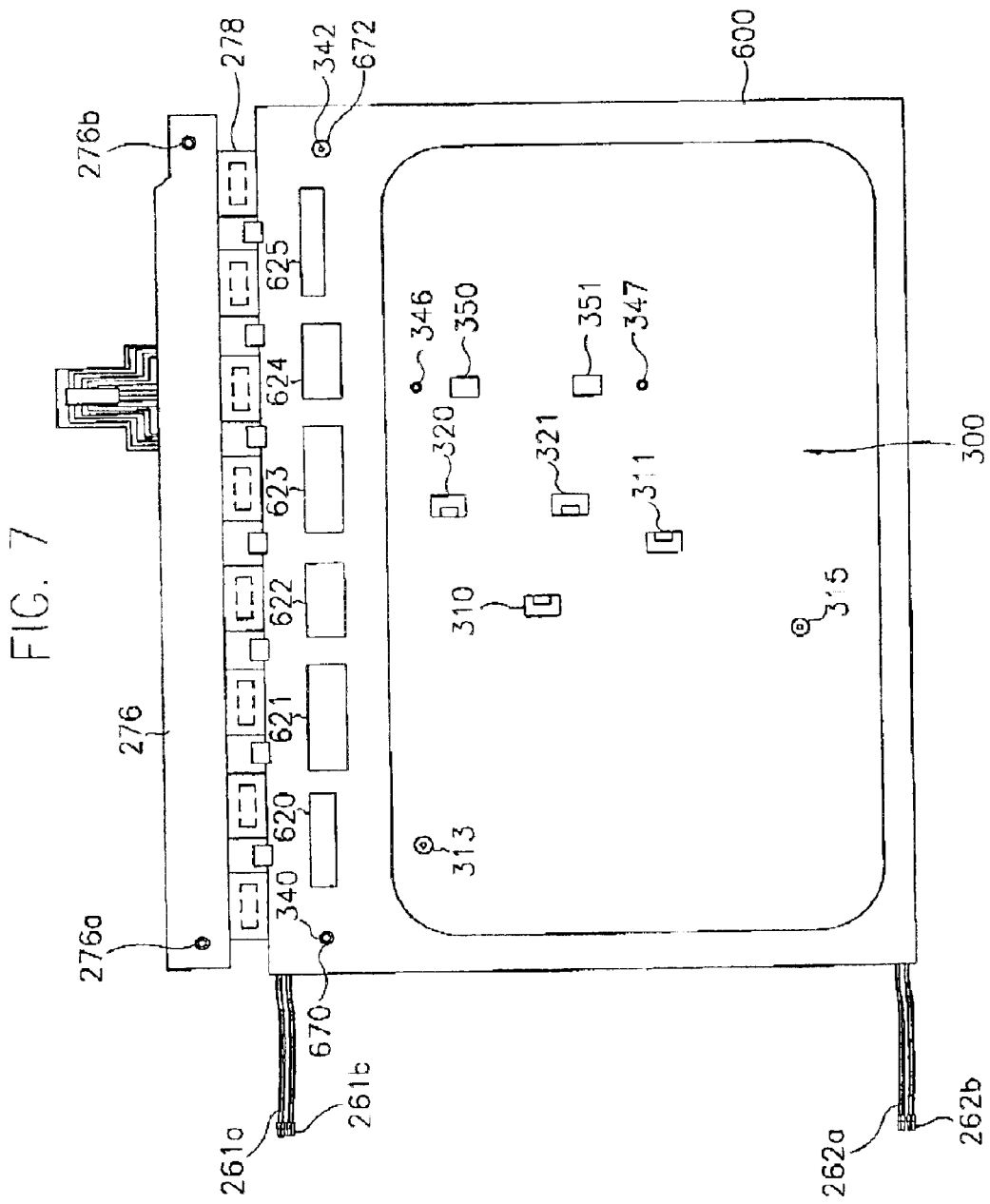
FIG. 7 is a sectional view showing a back surface of a bottom chassis and a mold frame of the LCD device shown in FIG. 6.
Figure 8:
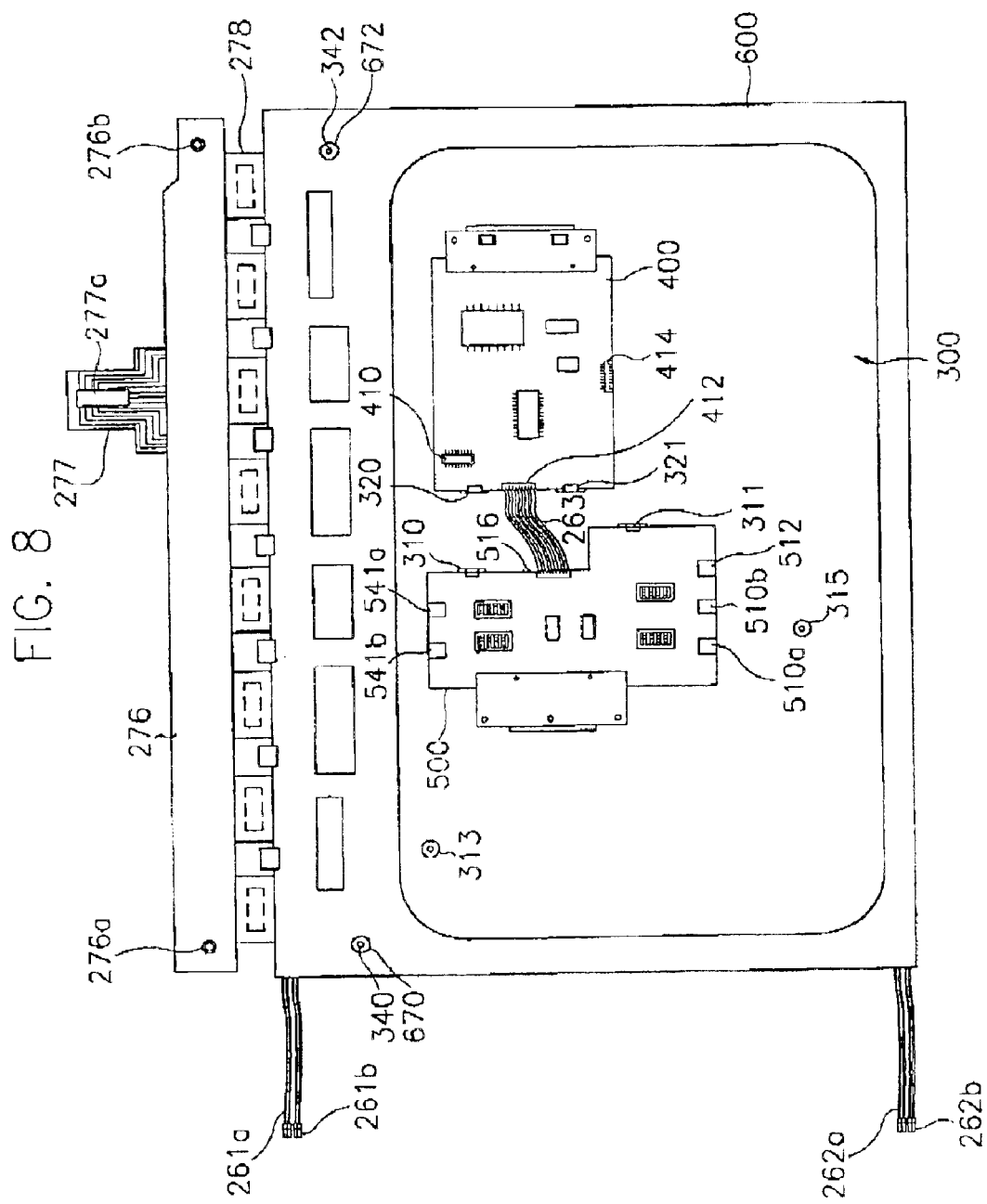
FIG. 8 is a view showing a construction of an inverter board and an analog/digital board combined with the bottom chassis shown in FIG. 7.
Figure 9:
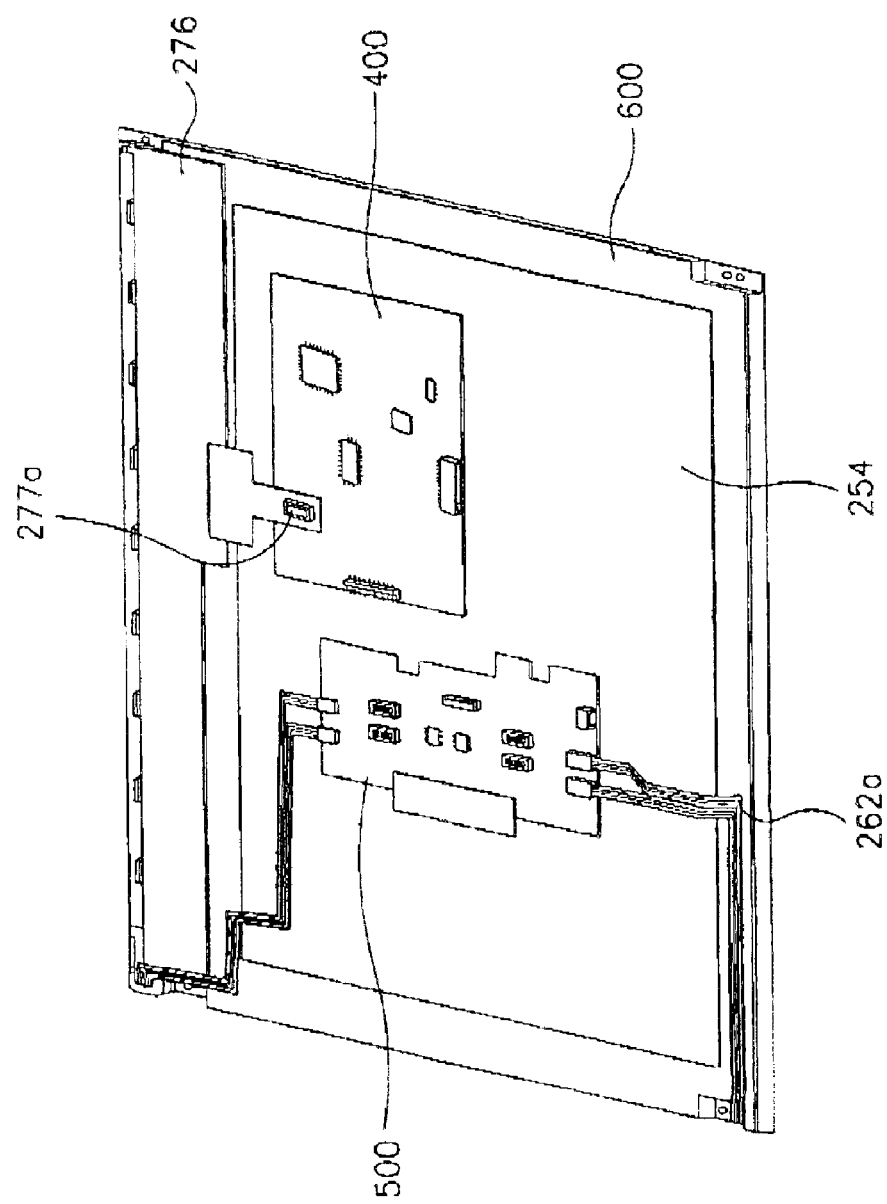
FIG. 9 is a view showing the LCD device, in which the integrated printed circuit board is combined with a back surface of the LCD device shown in FIG. 8.

FIGS. 7 to 9 are views of showing the constructions of the back surface of the LCD device as shown in FIG. 6.

Referring to FIG. 7, the mold frame 600 has a plurality of holes 620, 621, 622, 623, 624 and 625 to receive the circuit elements mounted on the integrated PCB 276. In addition, the mold frame 600 has an opening at the center portion of the bottom surface thereof so that the back surface of the bottom chassis 300 is exposed.

The reason for forming the opening in the bottom surface of the mold frame 600 in order to expose the back surface of the bottom chassis 300 is that the A/D board 400 and the inverter board 500 are faced to and directly fixed to the back surface of the bottom chassis 300.

If the A/D board 400 and the inverter board 500 are fixed to the bottom chassis 300 in the state that the mold frame 600 has no the opening, the A/D board 400 and the inverter board 500 are placed at a position so that the heights thereof increase as much as the thickness of the mold frame 600. Therefore, the thickness of the LCD device cannot be further reduced in order that the LCD device is made thinner and smaller.

Meanwhile, a first looking hole 313 is formed in the bottom surface of the bottom chassis 300, in which a securing member (not shown) is combined so as to secure a first power supply line 261a for supplying the electric power to a lamp of the first lamp unit 261 to the back surface of the bottom chassis 300. Furthermore, a second locking hole 315 is formed in the bottom surface of the bottom chassis 300, in which a securing member (not shown) is combined so as to secure a second power supply line 262a for supplying the electric power to a lamp of the second lamp unit 262 to the back surface of the bottom chassis 300. The construction in that the first and second power supply lines 261a and 262a are secured to the back surface of the bottom chassis 300 by means of the securing members will be explained below.

First and second projections 310 and 311 are formed on the back surface of the bottom chassis 300 to prevent the inverter board 500 from separating from the bottom chassis 300 before the inverter board 500 is secured to the bottom chassis 300 by means of the screws. Similarly, third and fourth projections 320 and 321 are formed on the back surface of the bottom chassis 300 to prevent the A/D board 400 from separating from the bottom chassis 300 before the A/D board 400 is secured to the bottom chassis 300 by means of the screws. In addition, fifth and sixth projections 350 and 351 are formed on the back surface of the bottom chassis 300 at a predetermined distance from the third and fourth projections 320 and 321 to help the third and fourth projections 320 and 321 to prevent the A/D board 400 from separating from the bottom chassis 300.

Third and fourth looking holes 340 and 342 are formed at the back surface of the bottom chassis 300 to combine the integrated PCB 276 with the bottom chassis 300 by means of the screws (not shown). In addition, fifth and sixth locking hole 276a and 276b are formed at the integrated PCB 276 to face to the third and fourth locking holes 340 and 342. At that time, the third and fourth locking holes 340 and 342, which are used for securing the integrated PCB 276 to the bottom chassis 300, are covered with a skin of the mold frame 600. Accordingly, the mold frame 600, in which the third and fourth locking holes 340 and 342 are formed, has first and second through-holes 670 and 672 formed at positions thereof corresponding to the third and fourth locking holes 340 and 342 to expose the third and fourth locking holes 340 and 342 to the outside.

The first and second projections 310 and 311 are formed by partially cutting the bottom chassis 300 to guide the inverter board 500 to a combination position. Similarly, the third to sixth projections 320, 321, 350 and 351 guide the A/D board 400 to a combination position.

As shown in FIG. 8, the inverter board 500 is combined to the bottom chassis 300 as moved from the first locking hole 313 to the first and second projections 310 and 311. When the movement of the inverter board 500 is stopped by means of the first and second projections 310 and 311 for preventing the inverter board 500 from being separated from the bottom chassis 300, the inverter board 500 is kept in an initial installation state by means of the first and second projections 310 and 311 until the shield case 700 is mounted on and secured to the back surface of the bottom chassis 300 by means of screws (not shown).

Similarly, the A/D board 400 is combined to the bottom chassis 300 as moved from the fourth locking hole 342 to the third and fourth projections 320 and 321. When the movement of the A/D board 400 is stopped by means of the third and fourth projections 320 and 321, the A/D board 400 is kept in an initial installation state by means of the third to sixth projections 320, 321, 350 and 351.

As shown in FIG. 8, the A/D board 400 and the inverter board 500 are concentrically mounted at the center portion of the back surface of the bottom chassis 300 exposed through the opened bottom surface of the mold frame 600. In FIG. 8, the back surface of the bottom chassis 300 is considerably exposed out of the A/D board 400 and the inverter board 500.

Referring to FIG. 9, after the A/D board 400 and the inverter board 500 are mounted on the bottom chassis 300, the integrated PCB 276 is bent to the back surface of the mold frame 600 so that a connector 277a of the integrated PCB 276 is connected to a first connector 410 of the A/D board 400. At this time, the connector 277a of the integrated PCB 276 is formed in the flexible printed circuit board 277 having a conductive pattern to transmit the signals from the A/D board to the integrated PCB 276.

Next, the first and second power supply lines 261a and 262a are guided to the inverter board 500 along the back surface of the bottom chassis 300 so as to be connected to fourth, fifth, seventh and eighth connectors 510a, 510b, 514a and 614b formed in the inverter board 500, respectively. The A/D board 400 and the inverter board 500 are connected to each other by means of the second and ninth connectors 412 and 516.

Hereinafter, a method of securing the first and second power supply lines 261a and 262a to the back surface of the bottom chassis 300 will be described with reference to FIGS. 10 to 13. Since the methods of respectively securing the first and second power supply lines 261a and 262a are the same, the method of securing the second power supply line 262 to the back surface of the bottom chassis 300 will be explained as an example. In the embodiment of the present invention, furthermore, the first and second lamp units 261 and 262 respectively have two lamps.

FIGS. 10 to 13 show the state in that the power supply line for a lamp shown in FIG. 8 is combined to the bottom chassis 300 of the LCD device by using the first securing member 910 according to an embodiment of the present invention.

Figure 10:
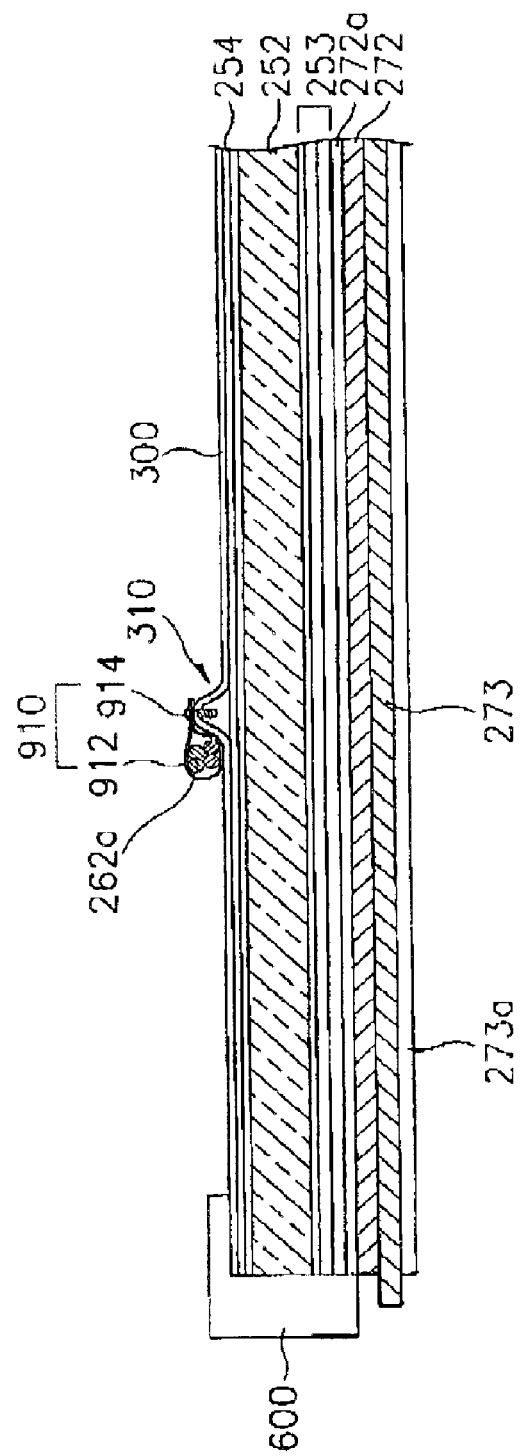
FIGS. 10 and 11 are views showing states in that a power supply line for a lamp shown in FIG. 8 is connected to a back surface of the LCD device by means of a fixing member according to an embodiment of the present invention.
Figure 11:
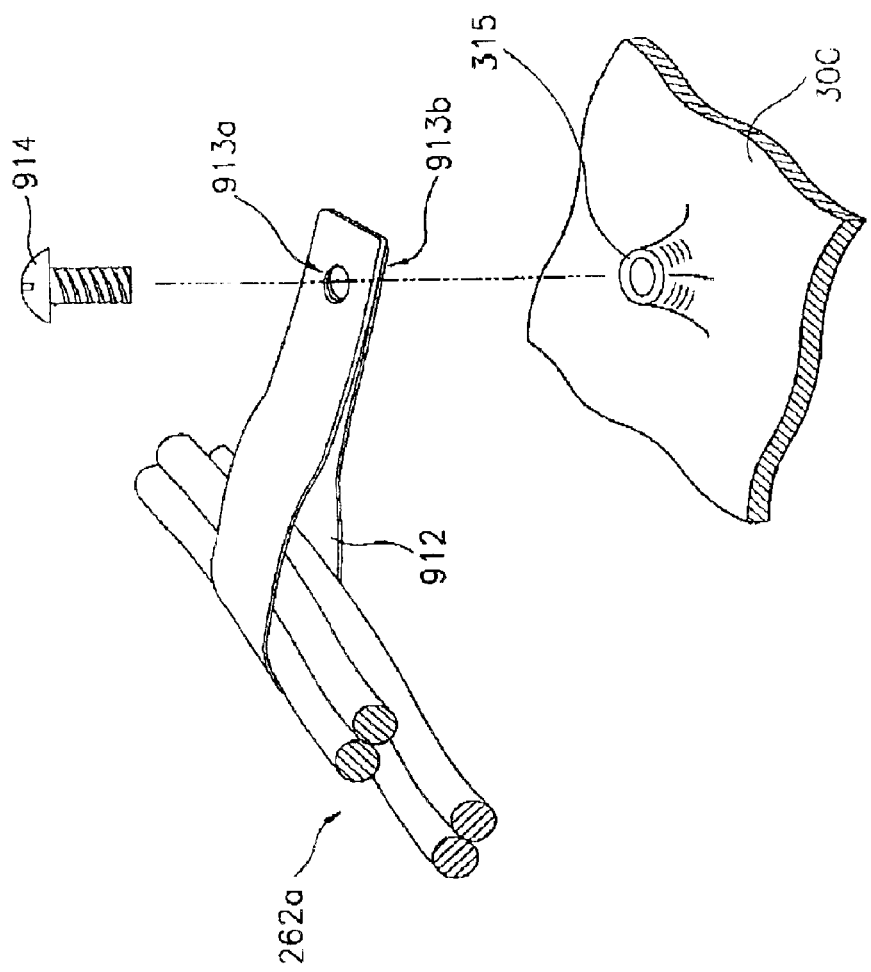

Referring to FIGS. 10 and 11, the second locking hole 315 is formed on the bottom chassis 300 and an area of the bottom chassis 300 adjacent to the second locking hole 315 is projected at a predetermined height. But, the second locking hole 315 has a lower height than the highest part of the parts constructing the A/D board 400 and the inverter board 500 that are combined to the back surface of the bottom chassis 300.

As shown in FIG. 11, the second power supply line 262a is enclosed by means of a flexible securing band 912 in a bundle. The flexible securing band 912 enclosing the second power supply line 262a has first and second thru-holes 913a and 913b at both ends thereof.

When enclosing the second power supply line 262a, the flexible securing band 912 has an adjusted length so that the first and second thru-holes 913a and 913b face to each other. After the first and second thru-holes 913a and 913b are corresponding to the second locking hole 315 of the bottom chassis 300, the flexible securing band 912 is combined to the second locking hole 315 by using the first locking screw 914.

As shown in FIG. 10, the first locking screw 914 extends through the first and second thru-holes 913a and 913b and through the second locking hole 315 in turn to be combined with the back surface of the bottom chassis 300. As described above, the area of the bottom chassis 300 adjacent to the second locking hole 315 is projected at the predetermined height from the back surface of the bottom chassis 300 to provide a space in which the first locking screw 914 is combined to the second locking hole 315. The second power supply line 262a is secured to the bottom chassis 300 by means of the flexible securing member 912 within a range of the height of the second locking hole 315.

Figure 12:
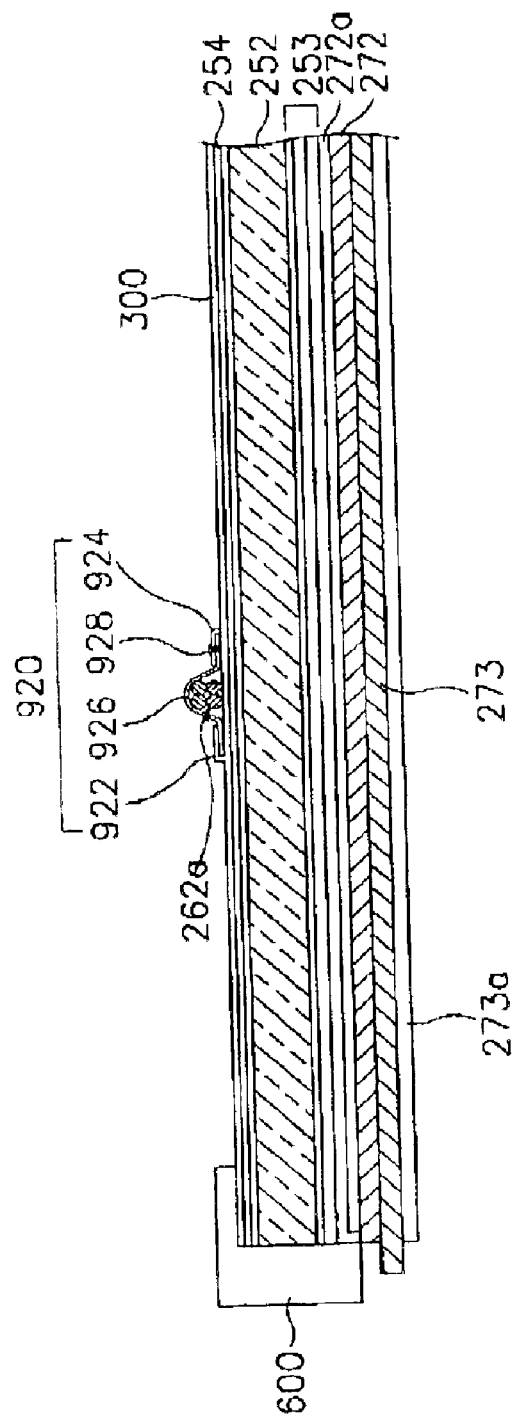
FIGS. 12 and 13 are views showing states in that a power supply line for a lamp shown in FIG. 8 is connected to a back surface of the LCD device by means of a securing member according to another embodiment of the present invention.
Figure 13:
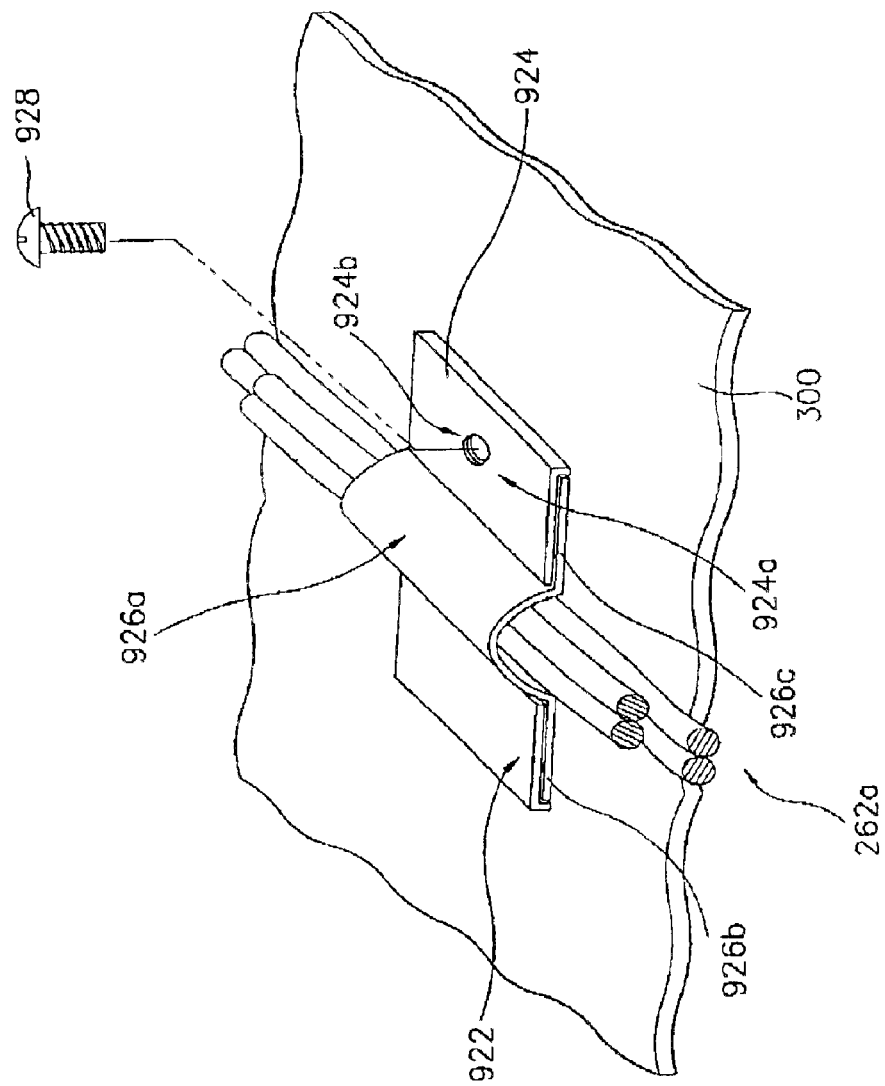

Meanwhile, FIGS. 12 and 13 show a construction in which the first and second power supply lines 261a and 262a are secured to the back surface of the bottom chassis 300 by using a second securing member 920 according to another embodiment of the present invention.

Referring to FIGS. 12 and 13, first and second securing elements 922 and 924 are formed on the back surface of the bottom chassis 300. The first and second securing elements 922 and 924 are formed by partially cutting the bottom surface portion of the bottom chassis 300 to provide a space between the first and second securing elements 922 and 924 and the bottom chassis 300. Furthermore, the first and second securing elements 922 and 924 are spaced at a predetermined distance apart from each other. The second securing element 924 has a third thru-hole 924a formed therein. The third thru-hole 924a may be formed in the first securing element 922 or in the respective first and second securing elements 922 and 924.

The second securing member 920 has a securing segment 926 for securing the second power supply line 262a received between the first and second securing elements 922 and 924. The securing segment 926 has a semi-cylindrical body 926a to provide a space in which the second power supply line 262a is received between the securing segment 926 and the bottom chassis 300. First and second wings 926b and 926c extend outwardly at a predetermined length from both ends of the body 926a. The second wing 926c has a fourth thru-hole 924b corresponding to the third thru-hole 924a formed in the second securing element 924.

As shown, the second power supply line 262a is received in the semi-cylindrical body 926a. In this state, when the securing segment 926 is pushed to a side of the first and second securing elements 922 and 924, the first and second wings 926b and 926c are respectively inserted into the space between the first and second securing elements 922 and 924 and the bottom chassis 300 below the first and second securing elements 922 and 924.

At that time, the securing segment 926 is inserted into the first and second securing elements 922 and 924 so that the third thru-hole 924a formed in the second securing elements 924 faces to the fourth thru-hole 924b formed in the second wing 926c. Next, when the second locking screw 928 is locked to extend through the third and fourth thru-holes 924a and 924b, the second power supply line 262a is secured to the back surface of the bottom chassis 300 as shown in FIG. 12.

If the first and second power supply lines 261a and 262a are not secured to the back surface of the bottom chassis 300 by using the first or second securing member 910 and 920, the first and second power supply lines 261a and 262a extending to the inverter board 500 are separated from the back surface of the bottom chassis 300. As a result, the first and second power supply lines 261a and 262a repeatedly collide with other structures on the back surface of the bottom chassis 300, so that the coating of the first and second power supply lines 261a and 262a can become damaged.

Accordingly, an exposed electric wire of the first and second power supply lines 261a and 262a can be caused to short with the other conductive elements, for example circuit parts of the integrated PCB 276 and the inverter board 500. If the first and second power supply lines 261a and 262a are not secured to a certain position on the bottom chassis 300, furthermore, the first and second power supply line 261a and 262a interrupt the assembling of another structure at the next assembly step, resulting in not performing the process of assembling the LCD device. Similarly, the first power supply line 261a is also secured to the back surface of the bottom chassis 300 by means of the same securing member as is the first or second securing member 910 or 920 for securing the second power supply line 262a to the bottom chassis 300.

As described above, after the A/D board 400 and the inverter board 500 are combined to the back surface of the bottom chassis 300, and after the first and second power supply lines 261a and 262a are connected to the inverter board 500, the shield case 700 is combined to the back surface of the bottom chassis 300.

Figure 14:
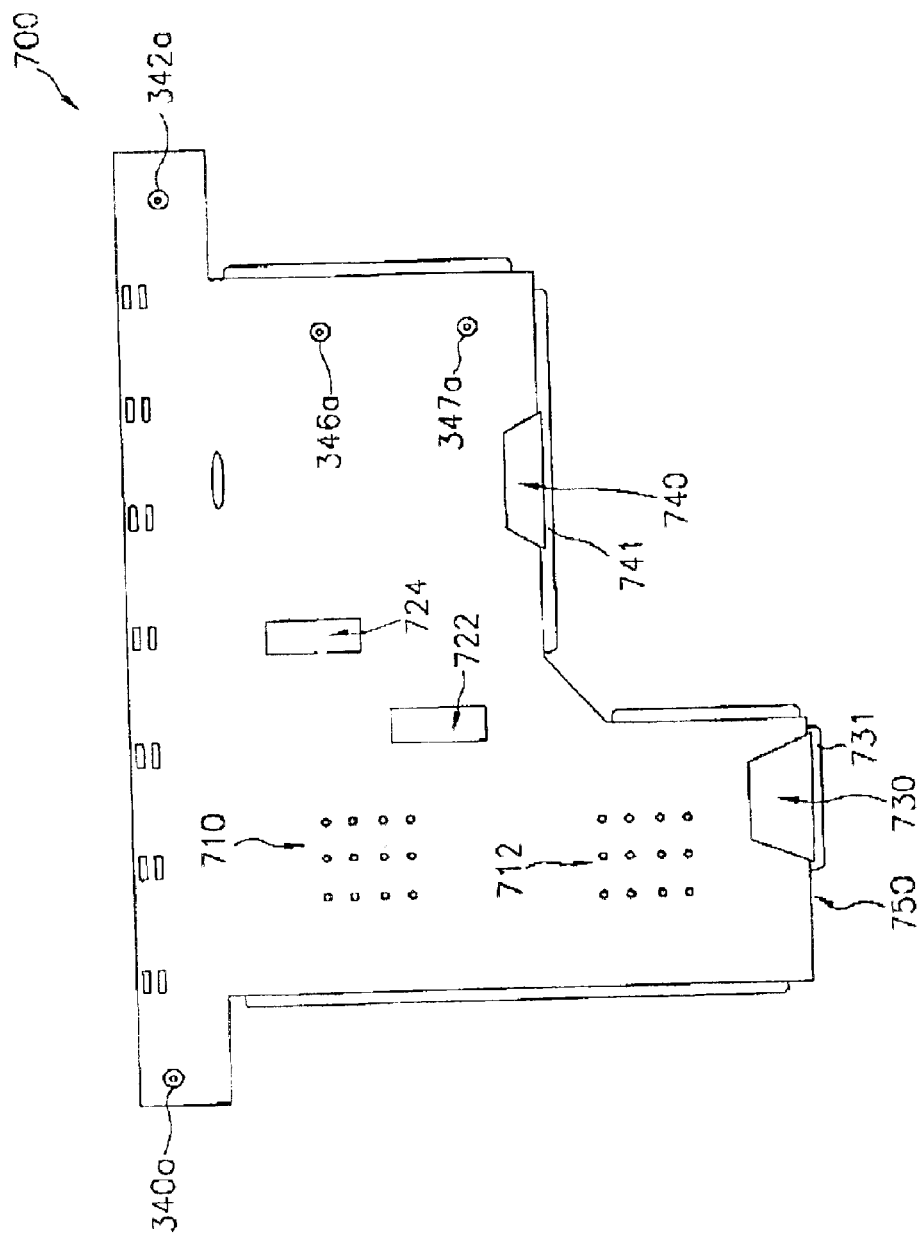
FIG. 14 is a plan view showing a construction of a shield case shown in FIG. 5.
Figure 15:
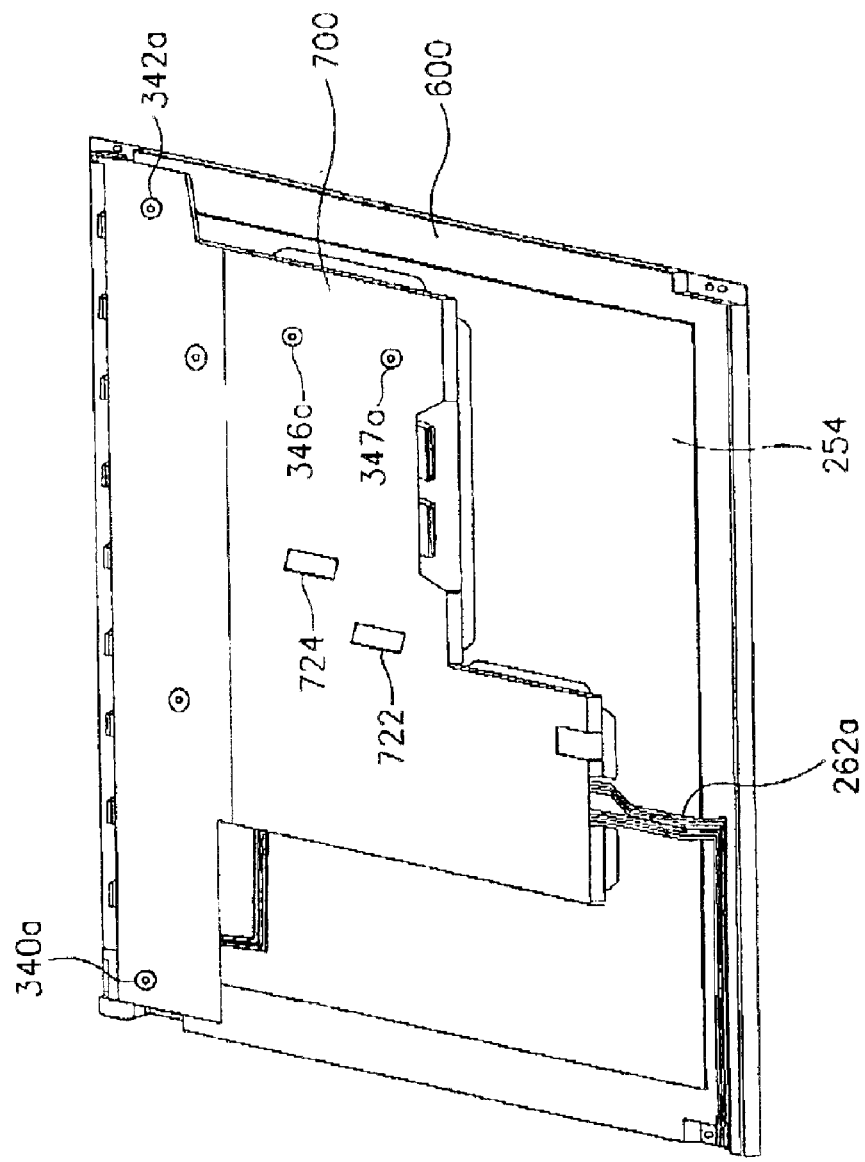
FIG. 15 is a view showing a state in that a shield case is combined with the back surface of the LCD device shown in FIG. 9.

FIG. 14 is a plan view showing the construction of the shield case 700 shown in FIG. 5, and FIG. 15 is a view of showing the LCD monitor of which the shield case 700 shown in FIG. 10 is combined to the back surface.

Referring to FIG. 14, the shield case 700 protects the A/D board 400 and the inverter board 500 mounted on the bottom chassis 300 while isolating the electromagnetic waves from the A/D board 400 and the inverter board 500.

Ninth, tenth, eleventh and twelfth locking holes 340a, 342a, 346a and 347a are formed in a bottom surface of the shield case 700 to be corresponding to third, fourth, seventh and eighth locking holes 340, 342, 346 and 347 formed in the bottom chassis 300.

On the other hand, first and second openings 710 and 712 are formed in a region of the shield case 700 that covers the inverter board 500 to facilitate a discharge of heat generated from the inverter board 500. Particularly, it is preferable that the first and second openings 710 and 712 are formed in the shield case 700 at a position adjacent to an element generating a large amount of heat, such as a transformer (not shown) of the circuit parts constructing the inverter board 500.

Furthermore, a part of the shield case 700 is cut to form first and second windows 722 and 724. The worker can identify through the first and second windows 722 and 724 whether the line 263 for electrically connecting the inverter board 500 with the A/D board 400 is normally connected with the second and ninth connectors 412 and 516 (not shown in FIGS. 14–15).

If the first and second windows 722 and 724 are not formed in the shield case 700, the worker or a user must dismantle and combine the bottom chassis 300 from/with the shield case 700 every time in order to identify whether the connectors connecting the integrated PCB 276 with the A/D board 400, or the A/D board 400 with the inverter board 500, are normally connected with each other.

Furthermore, the shield case 700 has first and second connection segments 730 and 740 formed by cutting a predetermined portion of a sidewall of the shield case 700. After the shield case 700 is mounted on the back surface of the bottom chassis 300, the worker can connect the line for supplying the outer electric power to the inverter board 500 and the line for providing the outer data signals to the A/D board 400 to the sixth connector 512 and the third connector 414 (not shown in FIGS. 14–15) through the first and second connection segments 730 and 740, respectively.

However, the sidewall in which the first and second connection segments 730 and 740 are formed is not completely opened. In other words, the first and second connection segments 730 and 740 are formed in an opening closed by the shield case 700. In the preferred embodiment of the present invention, the first and second connection segments 730 and 740 are partially connected with each other at bottom portions thereof by means of first and second connecting parts 731 and 741. As the first and second connection segments 730 and 740 are formed in a closed form as described above, the capability of the shield case 700 for insulating the electromagnetic wave can be improved.

Meanwhile, the shield case 700 has a relatively narrower width in a most portion thereof except for the end which protects the integrated PCB 276. This is because the A/D board 400 and the inverter board 500 are covered with the shield case 700 to isolate the electromagnetic waves and are concentrically mounted at the center portion of the bottom chassis 300.

Referring to FIGS. 8 and 15, particularly, even though the A/D board 400 and the inverter 500 are combined to the back surface of the bottom chassis 300, most of the back surface of the bottom chassis 300 and the mold frame 600 is exposed, except for a region, in which the integrated PCB 276, the A/D board 400 and the inverter board 500 are mounted. In addition, the shield case 700 is a member for isolating the electromagnetic waves generated from the integrated PCB 276, the A/D board 400 and the inverter board 500. Even if the shield case 700 is combined to the back surface of the bottom chassis 300, accordingly, most of the edge of the bottom chassis 300 and of the mold frame 600 is exposed as shown in FIG. 15.

Figure 16:
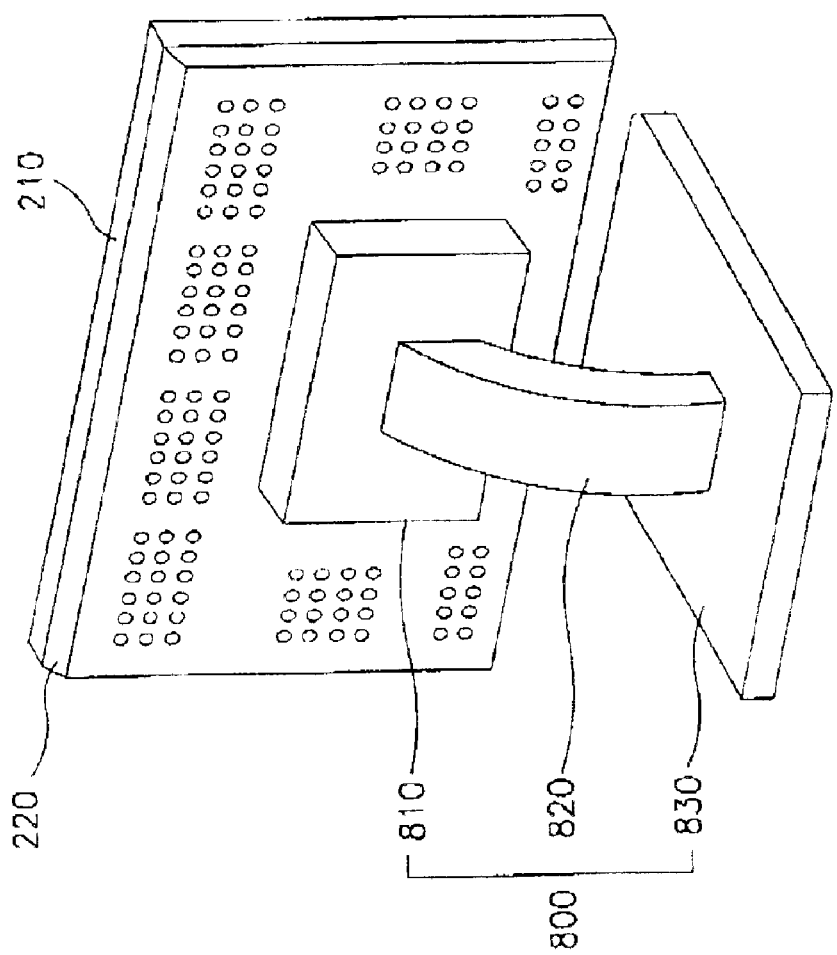
FIGS. 16 and 17 are perspective views showing an exterior of the LCD device shown in FIG. 5.
Figure 17:
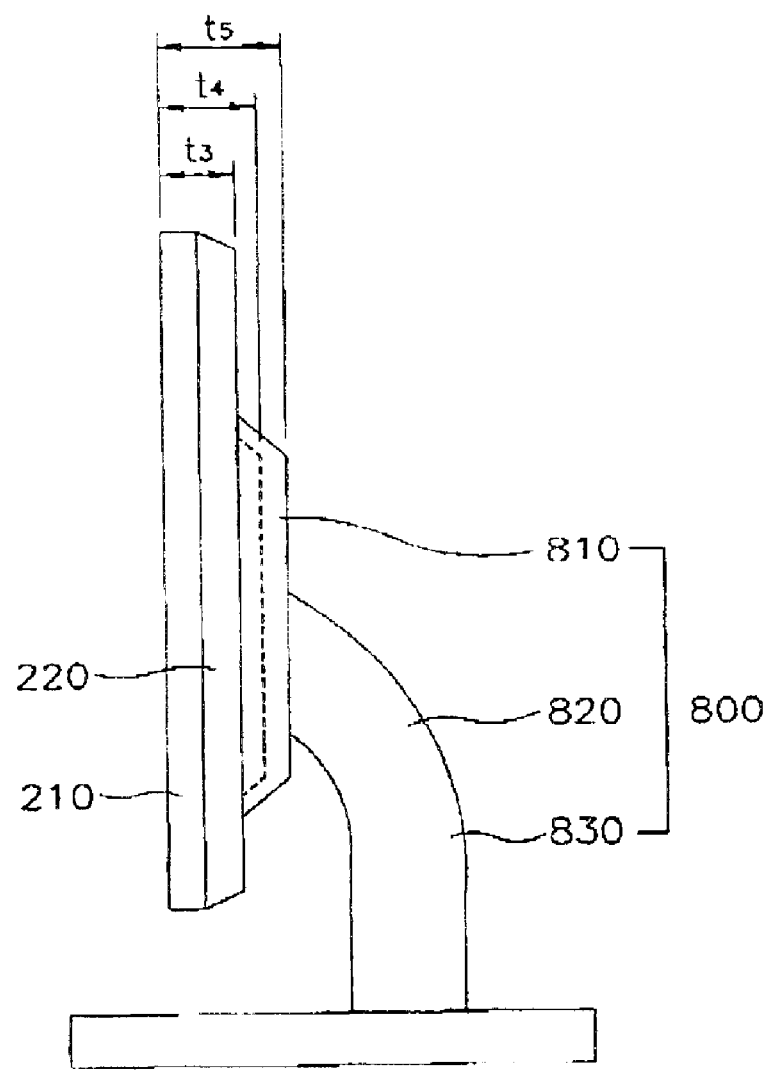

When the front case 210 is faced and combined to the rear case 220 after the shield case 700 is mounted on the back surface of the bottom chassis 300 as described above, the assembly of the LCD monitor is completed as shown in FIGS. 16 and 17.

FIGS. 16 and 17 are perspective views showing an exterior of the LCD monitor device shown in FIG. 5.

Referring to FIGS. 16 and 17, the thickness t3 of the edge of the LCD device, to which the front and rear cases 210 and 220 are combined, is smaller than the thickness t4 of the center portion of the bottom chassis 300 on which the A/D board 400 and the inverter board 500 are mounted. As described already, this is because the shield case 700 covers only the region in which the integrated PCB 276, the A/D board 400 and the Inverter board 500 are mounted.

In order to use the LCD device, a support 800 for supporting the LCD device has to be connected to the rear case 220.

As shown in FIGS. 16 and 17, the support 800 includes a cover 810 having a recess for receiving the projected center portion of the rear case 220 and abutments 820 and 830, which are combined to the cover 810, for providing a supporting force to the cover 810.

In FIGS. 16 and 17, in the state that the rear case 220 covers the shield case 700, the cover 810 of the support 800 receives the projected center portion of the rear case 220. However, the rear case 220 may be partially cut so that the shield case 700 is exposed outside. In other words, after a region of the rear case 220 corresponding to the shield case 700 is opened, the shield case 700 that is exposed out of the rear case 220 is covered with the cover 810 of the support 800. In this case, the total thickness t5 of the LCD device, including the thickness of the cover 810 of the support 800, becomes thinner. As a result, the thin and lighter LCD monitor can be obtained.

According to the LCD device as described above, the inverter board 500 for supplying the electric power to the lamp unit and the A/D board 400, for converting and providing the outer data signals to the integrated PCB are in direct and close contact to and combined with the back surface of the bottom chassis 300.

Furthermore, the shield case for isolating the electromagnetic waves generated from the A/D board 400 and the inverter board 500 covers the A/D board 400 and the inverter board 500 so that the edges of the bottom chassis 300 and the mold frame 600 are exposed.

Therefore, it is possible to manufacture the LCD device having an edge in which its thickness is the same as a total thickness of a LCD module. Accordingly, the total thickness of the LCD device is minimized, so that the thin and lighter LCD device can be obtained.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device comprising:
   display unit to display an image;
   receiving unit to receive the display unit;
   a printed circuit board mounted on a back surface of the receiving unit, to control an operation of the display unit; and
   shielding unit mounted on the back surface of the receiving unit, to shield electromagnetic waves from the printed circuit board,
   wherein the shielding unit is mounted on a center portion of the back surface of the receiving unit while enclosing the printed circuit board so that at least two opposite edges of the receiving unit are exposed at a predetermined width.

2. The liquid crystal display device of claim 1, wherein the receiving unit includes a bottom chassis to receive the display unit and a mold frame having a bottom surface opened so that a back surface of the bottom chassis in which the printed circuit board is mounted is exposed, for receiving the bottom chassis.

3. The liquid crystal display device of claim 2, wherein the shielding unit has a smaller area than either of the bottom chassis and the mold frame.

4. The liquid crystal display device of claim 1, wherein the printed circuit board includes at least one of a power supply unit and a single converting unit mounted on the back surface of the receiving unit, the power supply unit supplies power to the display unit and the signal converting unit converts signals supplied to the display unit.

5. The liquid crystal display device of claim 4, wherein the display unit includes an integrated printed circuit board electrically connected to the signal converting unit with a flexible printed circuit board, for controlling the operation and an operating time of the display unit in response to the signals from the power supply unit and the signal converting unit.

6. The liquid crystal display device of claim 5, wherein the integrated printed circuit board includes a data side printed circuit board and a gate side printed circuit board, which is combined with only one side of the display unit.

7. The liquid crystal display device of claim 4, further comprising:
   a power supply line for supplying the power from the power supply unit to a lamp of the display unit; and
   a fixing member for fixing the power supply line to the back surface of the receiving unit.

8. The liquid crystal display device of claim 7, wherein the fixing member includes a belt type fixing band having a first through-hole and second through-hole arranged at opposite ends of the belt type fixing band and the belt type fixing band is bent so that the first through-hole and the second through-hole are adjacent to each other to receive the power supply line and a first locking screw that extends through the first through-hole and the second through-hole of the belt type fixing band which is bent to receive the power supply line and fixed to the bottom chassis.

9. A liquid crystal display device, comprising:
   a displaying device having a display unit to display an image, receiving unit to receive the display unit, a printed circuit board mounted on a back surface of the receiving unit to control an operation of the display unit, and shielding unit mounted at a center portion of the back surface of the receiving unit such that the receiving unit has two exposed opposite edges, the shielding unit shields electromagnetic waves from the printed circuit board;
   a front case for receiving the displaying device in front of the displaying device; and
   a rear case combined with the front case in back of the displaying device,
   wherein the rear case has a region projecting at a predetermined height to receive the shielding unit.

10. The liquid crystal display device of claim 9, further comprising an abutment combined with the projected region in a back surface of the rear case, to support the displaying unit.

11. A liquid crystal display device, comprising:
    displaying unit to display an image;
    receiving unit that includes a bottom chassis to receive the displaying unit;
    a printed circuit board mounted on a back surface of the receiving unit to control an operation of the displaying unit, the printed circuit board including a power supply unit mounted on the back surface of the receiving unit to supply power to the displaying unit;
    a power supply line to supply the power from the power supply unit to a lamp of the displaying unit;
    a securing member including a belt type securing band that has a first through-hole and a second through-hole arranged at each end of the securing band and bent so that the first through-hole and the second through-hole are arranged adjacent to each other in order to receive the power supply line, and a first locking screw that extends through the first through-hole and the second through-hole of the securing band to secure the securing band to the bottom chassis, the securing member securing the power supply line to the back surface of the receiving unit; and
    shielding unit mounted on the back surface of the receiving unit to cover the printed circuit board so as to shield electromagnetic waves from the printed circuit board,
    wherein the shielding unit is mounted on a center portion of the back surface of the receiving unit while enclosing the printed circuit board so that edges of the receiving unit are exposed at a predetermined width.

12. A liquid crystal display device, comprising:
    displaying unit to display an image;
    receiving unit to receive the displaying unit;
    a printed circuit board mounted on a back surface of the receiving unit to control an operation of the displaying unit;
    shielding unit mounted on the back surface of the receiving unit covering the printed circuit board and shielding electromagnetic waves from the printed circuit board;
    a front case combined with the receiving unit in front of the receiving unit; and
    a rear case combined with the front case in back of the shielding unit,
    wherein the front case and rear case have a first thickness at a position corresponding to edges of the receiving unit and the front case and the rear case have a second thickness, which is thinner than the first thickness, the second thickness at a position corresponding to the shielding unit.

13. The liquid crystal display device of claim 12, wherein the receiving unit includes a bottom chassis to receive the displaying unit and a mold frame, the mold frame has an opening in a bottom surface so that a back surface of the bottom chassis in which the printed circuit board is mounted is exposed.

14. The liquid crystal display device of claim 13, wherein the shielding unit has a smaller area than an area of the bottom chassis and the mold frame.

15. The liquid crystal display device of claim 13, wherein the printed circuit board includes at least one of a power supply unit and a signal converting unit mounted on the back surface of the receiving unit, and wherein the power supply unit supplies power to the displaying unit and the converting unit converts signals supplied to the displaying unit.

16. The liquid crystal display device of claim 15, wherein the displaying unit includes an integrated printed circuit board electrically connected to the signal converting unit via a flexible printed circuit board, to control the operation and an operating time of the displaying unit in response to signals from the power supply unit and from the signal converting unit.

17. The liquid crystal display device of claim 16, wherein the integrated printed circuit board includes a data side printed circuit board and a gate side printed circuit board, which are combined with only one side of the displaying unit.

18. The liquid crystal display device of claim 15, further comprising:

a power supply line to supply the power from the power supply unit to a lamp of the displaying unit; and a securing member to secure the power supply line to the back surface of the receiving unit.

19. The liquid crystal display device of claim 18, wherein the securing member includes a belt type securing band that has first though-hole and second through-hole arranged at opposite ends of the belt type securing band, wherein the belt type securing band is bent so that the first through-hole and second through-hole are adjacent to each other to receive the power supply line, and wherein a first locking screw extends through the first through-hole and second through-hole of the belt type securing band to secure the securing band to the bottom chassis.

20. A liquid crystal display device, comprising:

a display device including a display unit to display an image, a receiving unit to receive the display unit, a printed circuit board mounted on a back surface of the receiving unit to control an operation of the display unit, and shielding unit mounted at a center portion of the back surface of the receiving unit to shield electromagnetic waves from the printed circuit board;

a front case combined with the display device in front of the display device; and a rear case combined with the front case in back of the shielding unit, the rear case includes a projecting region that extends to a predetermined height to receive the shielding unit, wherein a portion of the front case and rear case have a first thickness at a position corresponding to edges of the receiving unit and a second thickness, which is thinner than the first thickness, at a position corresponding to the shielding unit.

21. The liquid crystal display device of claim 20, further comprising an abutment combined with the projecting region in a back surface of the rear case, to support the display device.

* * * * *

UNITED STATES PATENT AND TRADEMARK OFFICE
CERTIFICATE OF CORRECTION

PATENT NO. : 6,894,757 B2
APPLICATION NO. : 10/190561
DATED : May 17, 2005
INVENTOR(S) : Jin-Ho Ha and Se-In Chang Page 1 of 1

It is certified that error appears in the above-identified patent and that said Letters Patent is hereby corrected as shown below:

In the Claims

Col. 16, claim 12, line 63, please change the word "thinner" to "thicker".

Col. 18, claim 22, line 28, please change the word "thinner" to "thicker".

Signed and Sealed this
Eighth Day of April, 2014

Michelle K. Lee
*Deputy Director of the United States Patent and Trademark Office*